United States Patent [19]

Bishop et al.

[11] 4,425,618

[45] Jan. 10, 1984

[54] METHOD AND APPARATUS FOR INTRODUCING PROGRAM CHANGES IN PROGRAM-CONTROLLED SYSTEMS

[75] Inventors: Thomas P. Bishop, Aurora; Susan J. Picus, Wheaton, both of Ill.

[73] Assignee: Bell Telephone Laboratories, Incorporated, Murray Hill, N.J.

[21] Appl. No.: 323,812

[22] Filed: Nov. 23, 1981

[51] Int. Cl.³ .......................... G06F 7/00; G06F 9/19
[52] U.S. Cl. ..................................... 364/300; 364/200
[58] Field of Search ....................... 364/300, 200, 900

[56] References Cited

U.S. PATENT DOCUMENTS

| | | | |
|---|---|---|---|
| 3,568,157 | 3/1971 | Downing | 364/200 |
| 3,597,739 | 8/1971 | Kolatis | 364/300 |
| 3,652,804 | 3/1972 | Comella | 364/200 |
| 3,668,646 | 6/1972 | Hemdal | 364/200 |
| 3,723,976 | 3/1973 | Alvarez et al. | 364/200 |
| 3,772,654 | 11/1973 | Evans et al. | 364/300 |
| 3,845,474 | 10/1974 | Lange et al. | 364/200 |
| 3,909,795 | 9/1975 | Chang et al. | 364/200 |
| 3,969,701 | 7/1976 | Hemdal | 364/200 |
| 4,047,161 | 9/1977 | Davis | 364/200 |
| 4,121,286 | 10/1978 | Venton et al. | 364/200 |

OTHER PUBLICATIONS

Fabry, R. S., "How to Design a System in Which Modules can be Changed on the Fly," 2nd International Conf. on Soft. Eng., Oct. 1976, pp. 470-476.
Novak, R. E., "Dynamic Linking in a Real-Time Environment," GTE Automatic Electric Journal, Mar.-Apr. 1981, pp. 57-60.
Ulrich, W., "Design of High Reliability Continuous Operation Systems," Software Eng. Tech., Ed. Buxton and Randell; Apr. 1970, pp. 149-153.

*Primary Examiner*—Jerry Smith
*Assistant Examiner*—William G. Niessen
*Attorney, Agent, or Firm*—P. Visserman

[57] ABSTRACT

An arrangement for introducing modifications in the program of a program-controlled system. Each time a modified version of a selected program function is stored in the system, it is tagged with a function sequence number; meanwhile, the original version of the program function is retained in the system. Each time a program process is initiated, it is tagged with a process sequence number. The two types of sequence numbers are assigned from a common source. Whenever the selected program function is called by a program process, a comparison is made between the process sequence number and the function sequence number. If the comparison indicates that the process was initiated before the modification was stored in the system, the original version of the selected program function is executed; otherwise, the modified version is executed. Thus, the original version or the modified version is used consistently throughout the active life of a process.

14 Claims, 3 Drawing Figures

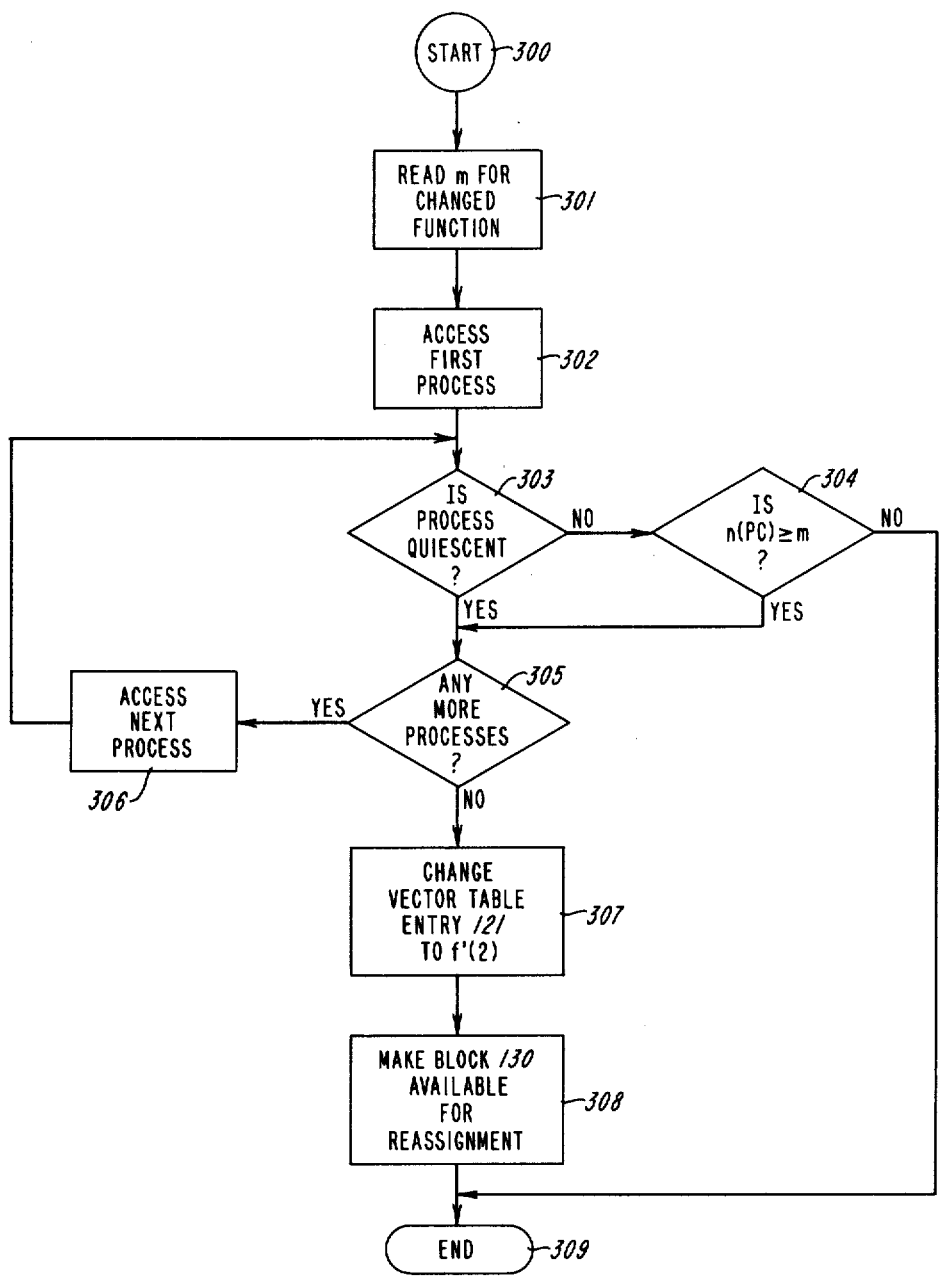

METHOD AND APPARATUS FOR INTRODUCING PROGRAM CHANGES IN PROGRAM-CONTROLLED SYSTEMS

TECHNICAL FIELD

This invention relates to methods for introducing program changes into program-controlled systems. More particularly, it pertains to a scheme for introducing such changes in a system during program execution without requiring initialization of the system.

BACKGROUND OF THE INVENTION

Program-controlled systems have been applied to a wide range of data processing and control applications. The functional flexibility of these systems comes from the program, stored in memory of such systems, which controls their operation.

In program-controlled systems, it is frequently necessary to introduce program changes after initial installation to accommodate new services and/or new hardware. The most common way of introducing such changes is by shutting down the system and completely reinitializing it. Unfortunately, this renders the system incapable of providing service for the initialization interval, usually, a period of several minutes or even hours. Moreover, initialization frequently destroys some portions of longer term data which may affect subsequent system performance; it may, for example, clear data provided by a telephone customer defining some aspect of his service. Initialization is especially undesirable if the program-controlled system controls continuous processes, such as chemical processes; careful plans must be made to introduce such initialization at a time when the controlled chemical processes have all been stopped or have reached some equilibrium.

A less drastic method of introducing program changes with partial initialization is accomplished, for example, in telephone electronic switching systems, such as the No. 1 Electronic Switching System described in the Bell System Technical Journal, September, 1964 issue, and in U.S. Pat. No. 3,570,008. The special characteristics of these systems have made it possible to introduce changes without disturbing those customers who are already connected to other customers. All data dealing with completed connections and with customer services is isolated and specially treated by initialization programs. These systems have duplicate processors, one of which is on-line and the other of which is a standby unit ready to take over control. A modified version of a program is loaded into one of the processors while the processor is in the standby mode. It is then switched on-line and executes an initialization program which does not modify any of the data associated with completed connections or customer services. The modified version of the program is then also loaded into the other processor and the system is in a stable state. Customers who were in the middle of dialing will not have their calls completed and therefore this kind of change is made during hours of very low system activity to minimize disturbance.

This method of introducing changes is not applicable to more sophisticated modern program-controlled systems. These systems are normally run under the control of a complex program called an operating system which initiates other programs called processes. The actual execution of system tasks is normally accomplished by the processes through execution of a series of program segments referred to as program functions. Execution of the program functions may be initiated by a function call from any process in the system. Program functions access a common data base, large portions of which are controlled by many processes, in which the linkages among various associated data items are manfold and complex. Such complex data structures drastically complicate the kind of special treatment of a selected portion of data used in the abovenoted prior art systems. Thus, initializing some processes while retaining others, while maintaining a consistent data base, is very difficult. Furthermore, it is impossible to predict the nature of program changes and to plan for these changes in the design of the data base. For all of the above reasons, it has been difficult to introduce all but the most minor program changes into the more sophisticated modern program-controlled systems without massive initialization.

SUMMARY OF THE INVENTION

It is an object of this invention to allow program changes to be introduced into program-controlled systems without interfering with ongoing processes, even while the system is operating under normal load.

In accordance with this invention, changes are introduced into the program of a program-controlled system by storing a modified version of a program function while retaining the current version, then causing all processes initiated prior to the change to execute the current version of that function, and causing all processes initiated after the change to execute the modified version of that function.

According to one embodiment, this is accomplished with the help of a system sequence number, maintained by the system. A system sequence number is changed only monotonically in a given direction and is changed at least every time that a modified program function is introduced into the system. The current value of the system sequence number is recorded with a process whenever the process is initiated. Whenever a modified version of a program function is stored in the system, a decision function sequence number is assigned to the modified function having a value which is beyond, in the given direction, the value of the process sequence number of any currently active process which uses that program function. The system sequence number is modified thereafter, so that it is at least as far in the given direction as the decision function sequence number. Subsequently, whenever a process calls the function which has been modified, the decision function sequence number is compared with the process number. If the result of the comparison indicates that the modified version was stored in the system before the calling process was initiated, the modified version of the program function is executed; otherwise, the current version is executed.

In one specific embodiment of the invention, program functions can be called by a process through the use of a vector in a stored transfer vector table, which normally points directly to the desired program function. If a modified program function is introduced into the system, the vector will, instead, point to a decision function. The decision function then makes the decision of whether the current or modified version of the program function is to be executed. If the current version is to be executed, a program branch to the current version is executed; otherwise, a program branch to the modified version is executed. Advantageously, the decision function may directly precede the modified version thereby simplifying the process of reclaiming storage space when old versions of program functions are no longer needed.

Periodically, an audit program may be run to determine if any active processes which deal with a program function, which has been modified, have a sequence number, that is, in the given direction, before that of the modified version of the program function. If there are no such processes, the current version of the program function may be deleted, the vector may point directly to the modified version of the function instead of pointing to the decision function, and the memory block occupied by the current version of the program function becomes available space for other new or modified program functions.

Advantageously, sequence numbers may be any set of numbers which change monotonically, either by being incremented, or by being decremented, so that it is possible to tell whether a given sequence number was assigned before another sequence number. Sequence numbers must change at least as often as program changes are introduced, and may change much more frequently. For example, it is possible to use a quantity representing date and time as a sequence number, since this quantity keeps changing monotonically by being positively incremented. This offers the further advantage of using a sequence number which may have added use, for example, to detect processes which have been in an active state for an excessive period of time. Also, if it is desired to load a modification some time before the modification is to be activated, the decision function sequence number can be preset to a quantity representing the activation time; the modification will then not be used before that activation time.

BRIEF DESCRIPTION OF THE DRAWING

The invention will be better understood from the following detailed description when read with reference to the drawing in which:

FIG. 3 is a flow chart of an audit program for reclaiming storage of an old version of a program when no longer needed.

DETAILED DESCRIPTION

Figure 1:
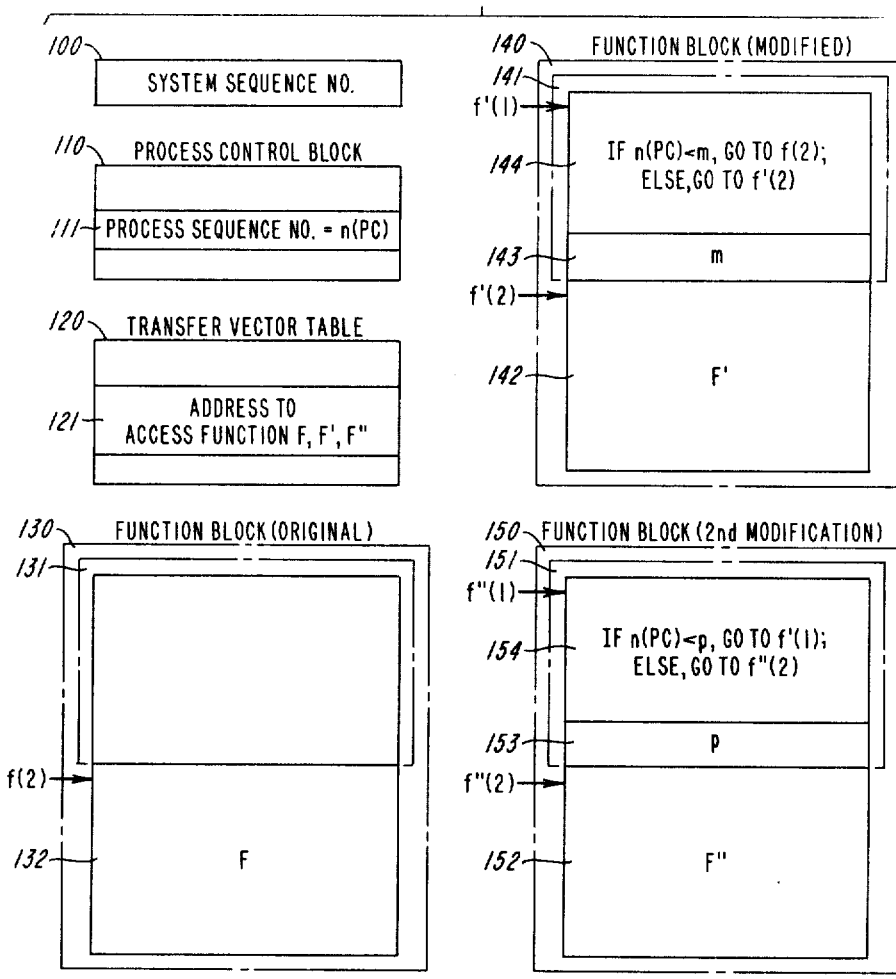
FIG. 1 is a memory layout of an illustrative embodiment of the invention, showing the addressing relationships between current and modified versions of a program function.

A program-controlled system has two types of information stored in its memory: programs and data. A program comprises a collection of basic instructions of a processor, each of which instructions directs some elemental step, so that the collection, when executed, accomplishes some broader system task or series of tasks. Data comprises information about the current status of a task, information derived from external sources and previously stored in the system, and information generated to accomplish the functional tasks of the system. Programs carry out their tasks by processing data and by controlling input/output systems in accordance with the current values of data.

In modern program-controlled systems, the basic control of the system resides in a master program, which, along with its associated data is called the operating system. The operating system directs the carrying out of system tasks by creating and invoking processes. A process is a program plus associated control data storage, called a process control block. The process control block keeps track of the context of each process including such information as the process identification, current process state, process priority, system time at process initiation, etc. Processes, in turn, accomplish their tasks by calling for the execution of a series of program functions.

Operating normally, a program-controlled system will usually have some processes that are active and some that are quiescent. A process is considered to be active during the period that it is actively executing a task, waiting for a block of time to continue its execution of a task, or waiting for input or output devices. Upon completion of a task, or set of tasks, it assumes the quiescent state and remains in that state until it is again initiated to execute another task or set of tasks. When a process enters a quiescent state, a minimum of data is carried over for subsequent use when the process is reinitiated. No direct program references are retained when a process becomes quiescent.

Any any stage in the life of a process, a program change may be introduced by storing a modifed program function in some available space in memory. However, incorrect results can be generated if a modified program function is used by a process that was already active prior to the introduction of the change. In order to ensure that each process uses the same program function throughout the time it remains active, decision functions are associated with each modified version of a program function. Decision functions are brief programs which determine when the process which called the program function was initiated— before or after the modified version of the program function was loaded into the system. If the modified version was loaded before the process was started, the modified version is used; if the modified version was loaded after the process was started, the current version is used.

A system sequence number is used to keep track of the order of events, i.e., whether a process was initiated before or after a modified version of a program function was loaded into the system. A system sequence number may be any quantity which is changed monotonically so that the ordering in time between two different sequence numbers can be established. For example, if a system sequence number is always incremented positively, then a greater system sequence number is associated with a later point in time than a lesser system sequence number. Time, comprising data and time-of-day, is used as the system sequence number in this embodiment.

In FIG. 1, block 100 contains the system sequence number, the time, automatically updated by the operating system using the system clock. The system clock is part of processor 200. It is well-known in the art and is not shown in the drawing. The mechanism for updating a time entry in memory is also known and is not described further herein.

A process sequence number representing time is stored in the process control block of a process whenever it is initiated. Process control block 110 contains the process control information associated with a typical process. As stated earlier herein, the process control block includes several items of information associated with the process. Location 111 of block 110, contains the process sequence number which indicates the time when the associated process was initiated. Whenever a process becomes active, the current value of the system sequence number is placed in location 111. A decision function sequence number, representing current time incremented by one second, is assigned to the decision function at the time a modified program function is loaded into memory.

Function blocks 130, 140, and 150 of FIG. 1 each represent an area of memory for storing a program. Each has an area for storing a decision function (131, 141, and 151) and an area for storing a program function (132, 142, and 152). The program functions represent a current version, F, (132), a modified version, F', (142), and a second modification, F", (152). Decision function block 141 comprises decision function program 144 and decision function sequence number 143 identified as m. The decision function program may be stated as follows: if the process sequence number, n(pc), is less than the decision function sequence number, m, go to f(2) (block 132); else, go to f'(2) (block 142). In other words, if the process was started before the change was introduced, use the current version of program function, F; otherwise, use the modified version of the program function, F'.

Programs are assigned to any available segment of memory. Individual program functions may be used by many processes, but stored only once to save valuable memory space. Since many programs may reference a program function, a list of the current addresses of all program functions is maintained and made available to all calling programs. This list is referred to as a transfer vector table. When a change is loaded into the system, the transfer vector table address is updated to point to the decision function associated with the modified version. When a process calls the program function which was modified, the decision function pointed to by the transfer vector table will determine whether the current or modified version of the program function is to be used. In transfer vector table 120, entry 121 points to the address of the example program function or decision function. If only one version of a program is loaded in the system, entry 121 is the address of the program function; if more than one version is loaded in the system, entry 121 is the address of a decision function that will permit the correct version of the program to be selected. When the modified version of the program function, F', is loaded in system memory, the vector table entry at 121 is changed from f(2), the address of the current version of the program function, to f'(1), the address of the decision function associated with F'. As a result, before either version of the program function is executed, the decision function compares process and decision function sequence numbers to decide whether the process was initiated before or after the change was introduced. If the process was initiated before the change, a branch to the current version F occurs; otherwise, the modified version F' is executed.

If there is some need for an additional modification, a second modification represented by F" in block 150 must be introduced. When F" is loaded in the system, entry 121 in the transfer vector table is changed to point to f"(1), the decision function associated with F". Block 150 comprises decision function, block 151, and program function F", block 152. The decision function block comprises decision function sequence number 153, represented by p, and decision function program 154. Decision function program 154 may be stated as follows: if the process sequence number, n(pc), is less than decision function sequence number, p, go to f'(1); else, go to f"(2). In other words, if the process was initiated before F" was loaded, a jump is made to decision function program 144 associated with version F'; otherwise F" is executed. The outcome of decision function program 144 is a jump to the original function, F, if the process sequence number, n(pc), is less than the decision function sequence number m; otherwise, program function F' is executed. In this example, processes use program functions F, F', or F". The oldest processes use F, intermediate processes use F', and the most recently initiated processes use F".

If it is necessary or desirable to modify a group of functions simultaneously, a decision function is inserted for each such program function, and the same sequence number assigned to all the decision functions associated with that group. Delayed activation of a program modification is also possible. The decision function sequence number associated with such a modification would be the delayed activation time. The modification would then not take effect until activation time.

This description has been in terms of a modification of a single program function. Clearly, many program functions can be modified using the techniques of this invention. Program modifications for many different program functions, loaded at different times, each modified program function having its own associated decision function, may exist in the system at the same time.

Figure 2:
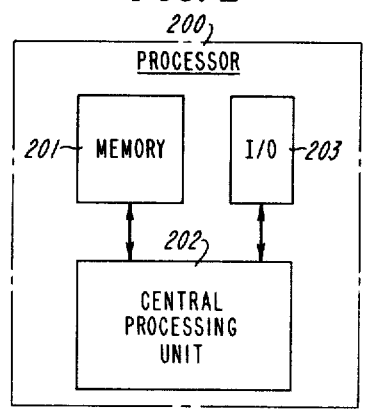
FIG. 2 is a block diagram of a processor of a program-controlled system.

FIG. 2 illustrates three major components of a program-controlled system, the central processor 202, the main memory 201, and input/output equipment 203. The central processing unit and its associated memory may be any of a number of modern processors wellknown in the art. For example, the VAX 11/780, manufactured by the Digital Equipment Corporation, including the associated memory, is such a processor. The input/output equipment may include supplementary memory devices such as magnetic tape units, and fixed or moving head disks. The central processing unit executes processes and program functions which are stored in memory. In executing such processes and program functions, the central processing unit accesses and modifies data stored in the memory. The central processing unit executes simple steps such as the comparison of two numbers, performing a conditional branch based on such a comparison, incrementing a quantity in memory, moving quantities stored in memory from one location to another, branching unconditionally to a directly or indirectly indicated address. The central processing unit is also capable of loading a modified version of a program function from input/output equipment 203 into main memory 201.

Periodically, audit programs are run both to reclaim memory space occupied by old versions of program functions that are no longer used and to update the transfer vector table with addresses of modified versions of program functions, in order to by-pass the nolonger needed decision function. FIG. 3 is a flowchart of an audit program that examines processes which might be using either the old program function F or the modified version F'. In this example, it is assumed that the audit program is run after modification F' is introduced into the system and before modification F" occurs.

The audit program may be considered in three parts: initial steps (300-302), looping (303-306), and reclaiming memory (307-308). The audit program is initiated by the operating system. The audit program must read the decision function sequence number, m, which is to be compared with the process sequence number of all active processes which might use the current or modified version of the program function. The first process is then accessed. The looping series of steps starts with a check to see if the process is quiescent. If the process is not quiescent, the process sequence number is compared with the decision function sequence nunber. If the process sequence number is not at least as great as the decision function sequence number, the audit program is terminated; this means that some active process is still using the current version of the program function. Otherwise, the looping process continues until all appropriate processes have been examined. If the audit program has not been terminated after all appropriate processes have been examined, the audit program can proceed to reclaim memory. It does so by changing the vector table entry to point directly to the modified version, and by making the memory space occupied by the current version available to the operating system for reassignment for other purposes.

As depicted in block 300 of the flowchart in FIG. 3, the audit program starts to execute after having been started by the operating system. The decision function sequence number, m, associated with F', is read by the audit program in 301. At 302, the audit program accesses the first process that uses F or F'. Then, at decision points 303 and 304, respectively, the audit program determines whether the process is equiescent, and whether its sequence number, n(pc), is greater than or equal to the decision function sequence number associated with F'. If both of these decisions are negative, the audit program concludes that the process is active and uses F, the current version of the program function. Since F is still being used by an active process, it cannot be deleted. Consequently, the audit program terminates at 309. If either of the decisions is positive, the audit program concludes that the process is either quiescent and prepared to use the modified version of the program function F' when it is initiated, or is already using F'. The audit program proceeds to decision point 305 where it determines if there are any more processes that use F or F'. If there are more such processes, the audit program accesses the next process at block 306 and cycles through decision points 303, 304, and 305 again.

The audit program repeats the cycle until all the processes that use functions F or F' have been examined. If no active processes using F have been discovered, there is no reason to retain the address of the decision function in the transfer vector table. Therefore, in block 307, the audit program changes the transfer table entry 121 to point directly to address f'(2) of the new program function F'. Because program function F is no longer referenced by any process and no longer can be addressed from the decision function, it is wastefully occupying space in memory. Since its space can be used for some other purpose, the audit program deletes program function F, releases block 130 as free memory space at 308, and terminates at 309. Note that block 130 also includes the space formerly occupied by a decision function when F was introduced as a program modification. By keeping the modification and its associated decision function together, the entire block of memory may be made available when F is no longer needed.

In some systems, it may be difficult for the audit program to determine whether a process is active or quiescent. In such a case, the check of block 303 may be by-passed. It may also be more convenient to examine all processes whether or not they use F or F'. The only adverse results of such simplifications are that the decision function remains active for a longer period than is necessary, and that the storage space occuped by the current version of the program function cannot be reclaimed as quickly.

A large class of program modifications can be introduced using the techniques of this invention, including modifications in programs which initiate and execute processes. Broadly, such programs are program functions called by the operating system which is also a group of program functions. Any program which is called indirectly may, in principle, be changed using the techniques of this invention. However, certain restrictions arise in making modifications to program functions which use data interpreted differently by the current and modified versions of a program function, particularly, where such data is retained during a quiescent interval of a process, or where such data is shared by two or more processes. Even when accessing such data, careful use of decision functions for data, in conjunction with decision functions for program functions, can allow modifications to be introduced to such data using the techniques of this invention. Note that any implied prerequisite is a single access point, such as a transfer vector for program functions, used whenever a decision function is used for accessing such data.

It is to be understood that the above-described embodiment is merely illustrative of the principles of this invention; other arrangements may be devised by those skilled in the art without departing from the spirit and scope of the invention.

What is claimed is:

1. In a program-controlled processor system wherein processes are initiated and are executed by function calls to program functions stored in a program memory, a method of modifying said program functions during execution of said processes, said method comprising the steps of:

generating a system sequence number;

assigning the present value of said system sequence number to each of said processes as a process sequence number at the time of initiation;

storing a modified version of a selected one of said program functions into said program memory while retaining a current version of said selected program function;

recording a decision function sequence number, the value of said decision function sequence number being beyond the present value of any process sequence number in a given direction;

changing said system sequence number in said given direction so that it reaches a value at least as far in said given direction as said decision function sequence number; and in response to a function call by a calling process to execute said selected function, executing said current version if the process sequence number of said calling process is before said decision function sequence number in said given direction, and executing said modified version if the process sequence number of said calling process is at least as far as said decision function sequence number in said given direction.

2. The method in accordance with claim 1 in which said executing step further comprises the steps of:

comparing the process sequence number of said calling process with said decision function sequence number;

branching to said current version if result of said comparison indicates that the process sequence number of said calling process is before said decision function sequence number in said given direction;

and branching to said modified version if result of said comparison indicates that the process sequence number of said calling process is at least as far as said decision function sequence number in said given direction.

3. The method in accordance with claim 1 in which said step or assigning comprises the step of storing said system sequence number in memory locations associated with each of said processes.

4. The method in accordance with claim 2 in which said current version of said selected program function comprises an intermediate version and an older version of said selected program function, and in which said step of branching to said current version if result of such comparison indicates that the process sequence number of said calling process is before said decision function sequence number in said given direction further comprises the steps of:

making a second comparison between the process sequence number of said calling process and a second decision function sequence number associated with said intermediate version of said selected program function;

branching to said older version it said second comparison indicates that the process sequence number of said calling process is before said second decision function sequence number in said given direction, and branching to said intermediate version if said second comparison indicates that the process sequence number of said calling process is at least as far as said second decision function sequence number in said given direction.

5. The method in accordance with claim 1, 2, 3, or 4 further comprising the steps of:

periodically, making third comparisons between the process sequence number of at least all active processes which make function calls to said selected program function and said decision function sequence number; and deleting said current version if none of said process sequence numbers of at least all active processes which make function calls to said selected program function is before said decision function sequence number in said given direction.

6. The method in accordance with claim 2 wherein said system comprises at least one vector table comprising a series of pointers to program functions and wherein said step of storing a modified version further comprises the step of changing a pointer in one of said vector tables which points to said current version of said selected program function to point to a program for executing said comparing and branching steps.

7. The method in accordance with claims 1, 2, 3, 4, or 6 in which said system sequence number is the time of day and date.

8. In a program-controlled processor system wherein processes are initiated and executed by function calls to program functions stored in a program memory, means for modifying program functions during the execution of said processes, said means comprising:

means for storing a system sequence number;

means associated with each process for storing a process sequence number;

means for storing a current version of a selected one of said program functions;

means for storing a modified version of said selected one of said program functions;

means for storing a decision function sequence number associated with said modified version;

processor means, operative under the control of instructions stored therein to store said current version in said means for storing said current version, to store said modified version in said means for storing said modified version, to generate and store a quantity in said means for storing a system sequence number, to copy said system sequence number into said means for storing a process sequence number when the associated process is initiated, at the time said modified version is stored, to store in said means for storing a decision function sequence number a quantity whose value exceeds at said time said modified version is stored the value of any process sequence number in a given direction, to change said system sequence number so that it reaches a value at least as far in said given direction as said decision function sequence number, to initiate execution of said current version of said selected function in response to a function call by a calling process to said selected function if the process sequence number of said calling process is before said decision function sequence number in said given direction and to initiate execution of said modified version of said selected function in response to a function call by said calling process to said selected function if the process sequence number of said calling process is at least as far as said decision function sequence number in said given direction.

9. A program-controlled processor system in accordance with claim 8 wherein said processor means is further operative to initiate execution of said current version and said modified version by comparing the process sequence number of said calling process with said decision function sequence number, by branching to said current version if said comparison indicates that the process sequence number of said calling process is before said decision function sequence number in said given direction and by branching to said modified version if said comparison indicates that the process sequence number of said calling process is at least as far as said decision function sequence number in said given direction.

10. A program-controlled system in accordance with claim 9 in which said current version of said selected program function comprises an intermediate version and an older version of said selected program function, in which said means for storing a decision function sequence number comprises means for storing a second decision function sequence number associated with said intermediate version, and in which said processor means is further operative to initiate execution of said intermediate and said older version by storing in said means for storing a second decision function sequence number at the time said intermediate version is stored a quantity whose value exceeds at said time said intermediate version is stored the value of any process sequence number in said given direction and changing said system sequence number so that it reaches a value at least as far in said given direction as said second decision function sequence number, making a second comparison between the process sequence number of said calling process and said second decision function sequence number, branching to said older version if said second comparison indicates that the process sequence number of said calling process is before said second decision function sequence number in said given direction, and branching to said intermediate version if said second comparison indicates that the process sequence number of said calling process is at least as far as said second decision function sequence number in said given direction.

11. A program-controlled processor system in accordance with claim 9 in which said processor means is further operative to periodically make third comparisons between the process sequence numbers associated with at least all active processes which make function calls to said selected function, and said decision function sequence number, and to delete said current version if none of the process sequence numbers associated with at least all active processes which make function calls to said selected function is before said decision function sequence number in said given direction.

12. In a program-controlled processor system, wherein task processes are initiated and are executed by function calls to program functions stored in a program memory,
 means for modifying a selected program function during the execution of task processes said means comprising:
 first means for storing a current version of said selected program function;
 second means for storing a modified version of said selected program function;
 third means for storing data defining an activation time after which said modified version of said selected program function is to be used; and
 means for initiating execution of said current version if a process calling said program function was initiated before said activation time, and for initiating execution of said modified version if said process calling said selected program function was initiated after said activation time.

13. A program-controlled processor system in accordance with claim 15 further comprising:
 system clock means for maintaining system date and time;
 process control means associated with each process for storing a process sequence number;
 in which said means for initiating execution comprise processor means, operative under the control of instructions stored therein, to store said system date and time as a process sequence number in said process control means whenever the associated process is initiated, to store data defining an activation time in said third means, to compare said activation time with the process sequence number of said process calling said selected program function prior to initiating execution of said selected program function, to initiate execution of said current version if said comparison indicates that the process sequence number of said process calling said selected program function is before said activation time, and to initiate execution of said modified version of said program function if said comparison does not indicate that the process sequence number of said process calling said selected function is before said activation time.

14. A program-controlled processor system in accordance with claim 16 in which said process control means comprise a memory location within a process control block associated with a process.

* * * * *

UNITED STATES PATENT AND TRADEMARK OFFICE
CERTIFICATE OF CORRECTION

PATENT NO. : 4,425,618

DATED : January 10, 1984

INVENTOR(S) : Thomas P. Bishop and Susan J. Picus

It is certified that error appears in the above-identified patent and that said Letters Patent is hereby corrected as shown below:

Column 2, line 6, "manfold" should read --manifold--.

Column 4, line 24, "Any", first occurrence, should read --At--; line 51 "data" should read --date--.

Column 7, line 29, "equiescent" should read --quiescent--.

Column 8, line 4, "occuped" should read --occupied--; line 25, "any" should read --an--.

Column 9, line 33, "it" should read --if--.

Column 12, line 11, (claim 13), "15" should read --12--; (claim 14) line 36, "16" should read --13--.

Signed and Sealed this

Sixth Day of November 1984

[SEAL]

Attest:

GERALD J. MOSSINGHOFF

Attesting Officer

Commissioner of Patents and Trademarks